Patented Oct. 28, 1924.

1,513,051

UNITED STATES PATENT OFFICE.

WALTER S. LANDIS, OF WHITESTONE LANDING, NEW YORK, AND GUY H. BUCHANAN, OF WESTFIELD, NEW JERSEY, ASSIGNORS TO AMERICAN CYANAMID COMPANY, OF NEW YORK, N. Y., A CORPORATION OF MAINE.

PROCESS OF FUMIGATING AND DISINFECTING.

No Drawing.     Application filed July 8, 1921. Serial No. 483,263.

*To all whom it may concern:*

Be it known that we, WALTER S. LANDIS and GUY H. BUCHANAN, citizens of the United States, respectively residing at Whitestone Landing, in the county of Queens, State of New York, and Westfield, in the county of Union and State of New Jersey, have invented certain new and useful Improvements in Processes of Fumigating and Disinfecting; and we do hereby declare the following to be a full, clear, and exact description of the invention, such as will enable others skilled in the art to which it appertains to make and use the same.

This invention relates to a method of simultaneously fumigating and disinfecting enclosed spaces, and has for its object to provide a process of this nature which will be comparatively simple and inexpensive to carry out, as well as more efficient than those which have been heretofore proposed.

With these and other objects in view, the invention consists in the novel steps and combinations of steps constituting the method, all as will be more fully hereinafter disclosed and particularly pointed out in the claims.

In order that the precise nature of the invention may be the more clearly understood, it is said:

In comparatively recent years, hydrocyanic acid gas has come to be used very extensively as a fumigant for the purpose of eliminating vermin from buildings, ships, vegetation, and other infested places. Its disinfecting or deodorizing value, however, seems to be rather less than its fumigation value, and it would, therefore, be of decided advantage to be able to use with it a satisfactory deodorizer or disinfectant, and so perform both operations at once.

In our copending application, filed July 8, 1921, Serial No. 483,262, entitled "Process of fumigating", we have disclosed the use of various aldehydes and accelerating agents for destroying hydrocyanic acid after fumigation. Now one of the more common aldehydes is formaldehyde, which is a good disinfectant or deodorizer, but of no substantial value as an insecticide as compared with hydrocyanic acid. We have shown in our said copending application that the reaction between hydrocyanic acid and the various volatile aldehydes is extremely slow without an eccelerating agent and in this invention we propose to introduce hydrocyanic acid gas and formaldehyde into the enclosed space at the same time, to the end that fumigation and disinfection may be carried on simultaneously.

The concentration of hydrocyanic acid usually employed for fumigation purposes ranges from 0.2 of one per cent to one per cent or more, by volume, and the dosage of formaldehyde gas which we find most suitable for effective use is from one to two ounces of gas, $CH_2O$, per 1000 cubic feet of space. When this quantity is introduced into a space suitably charged with hydrocyanic acid for effective fumigation, practically no reaction takes place between the two gases for four or five hours, or for a time more than sufficient for either fumigation or disinfection to be accomplished. In fact, no appreciable decomposition of either gas takes place until the proportion of formaldehyde gas is upwards of three or four times that needed for disinfection. Where the proportion of formaldehyde exceeds about five times the disinfecting standard, or from say, 5 to 10 ounces per 1000 cubic feet of space, then decomposition begins to show up in about five hours, to the extent of a loss of about one-third of the hydrocyanic acid present. As hydrocyanic acid is usually effective as a fumigant, when properly applied, in about two hours or less, this decomposition is not serious. Naturally these relationships are altered when accelerating agents are used, as disclosed in our said copending application above mentioned.

In carrying out our present process, the hydrocyanic acid may be introduced in the usual manner, as, for example, by spraying or atomizing liquid acid into the enclosure, or by direct generation therein from a reaction between sulphuric acid and sodium cyanide. The formaldehyde is then introduced in any desired manner, as by atomizing a formalin solution, or preferably by the chemical methods of generation. At the end of the operation and after the necessary time has elapsed, the room or other space may be opened up or ventilated, or more formaldehyde with an accelerating agent may be introduced and the hydrocyanic acid destroyed, as disclosed in our said copending application, Serial No. 483,262, filed July 8, 1921, for "process of fumigating."

It is obvious that those skilled in the art may vary the exact details of procedure without departing from the spirit of the invention, and therefore we do not wish to be limited to the above disclosure except as may be required by the claims.

What we claim is:

1. The process of simultaneously fumigating and disinfecting an enclosed space which consists in introducing hydrocyanic acid gas into said space, together with a disinfectant comprising a volatile aldehyde under such conditions that substantially no chemical reaction takes place between them for a period of time greater than that necessary to accomplish fumigation and disinfection; and maintaining said gases within said space for a time sufficient to accomplish said fumigation and disinfection, substantially as described.

2. The process of simultaneously fumigating and disinfecting an enclosed space which consists in introducing hydrocyanic acid gas and formaldehyde into said space, under such conditions that substantially no chemical reaction takes place between them for a period of time greater than two hours; and maintaining said materials within said space for a time sufficient to accomplish fumigation and disinfection, substantially as described.

In testimony whereof we affix our signatures.

WALTER S. LANDIS.
GUY H. BUCHANAN.